UNITED STATES PATENT OFFICE 2,573,732

1 - AMINO - 2,3 - DICYANO - 4 - OXYALKYL-AMINO ANTHRAQUINONES AND METHOD OF PREPARING THE SAME

Victor S. Salvin, Irvington, and John R. Adams, Jr., Summit, N. J., assignors to Celanese Corporation of America, New York, N. Y., a corporation of Delaware No Drawing. Application September 14, 1949, Serial No. 115,768

8 Claims. (Cl. 260—379)

This invention relates to the production of anthraquinone dyestuffs and relates more particularly to anthraquinone dyestuffs dyeing cellulose acetate or other organic derivative of cellulose textile materials in light to medium blue shades exhibiting a satisfactory resistance to acid fading.

An object of this invention is the production of novel anthraquinone dyestuffs capable of dyeing cellulose acetate or other organic derivative of cellulose textile materials in desirable blue shades.

Other objects of this invention will appear from the following detailed description.

Anthraquinone dyestuffs which dye cellulose acetate or other organic derivative of cellulose textile materials in desirable blue shades which are relatively fast to light and to washing are not uncommon but many of these dyestuffs are commercially unacceptable due to their inability to resist permanent changes in shade when exposed to atmospheric gases. This tendency for cellulose acetate or other organic derivative of cellulose textile materials dyed with many blue dyestuffs to undergo acid-fading is a problem in the dyeing art which has been the subject of a substantial amount of research with the view to eliminating this disadvantage.

We have found that anthraquinone dyestuffs of the following general formula:

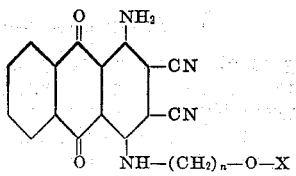

wherein $n$ is an integer of up to about 5 and X is an alkyl group or an hydroxyalkyl group not only dye cellulose acetate or other organic derivative of cellulose textile material in desirable blue shades with a substantial degree of affinity, but, in addition, the dyed textile materials thus obtained exhibit a very marked resistance to acid fading and to changes in shade due to washing or exposure to light. As examples of alkyl groups which may be present in said dyestuff there may be mentioned the methyl group, ethyl group, propyl group and isopropyl group, while examples of hydroxyalkyl groups are hydroxyethyl, hydroxypropyl and hydroxy-isopropyl groups.

Our novel dyestuffs are obtained by reacting the intermediate 1 - amino - 2-sulfo-4-brom-anthraquinone with the desired hydroxyalkoxyalkylamine or alkoxyalkylamine in an aqueous reaction medium in the presence of a suitable amination catalyst so as to cause the 4-brom-substituent to be replaced by the amine and then reacting the compound thus obtained with an alkali metal cyanide. This latter reaction causes the 2-sulfo group to be replaced by a cyano group and also causes a cyano group to enter in 3-position. The product thus obtained is the desired 1-amino-2,3-dicyano-4-hydroxyalkoxyalkylamine- or 4-alkoxyalkylamino-anthraquinone.

In effecting the initial amination reaction wherein the 4-brom group is replaced, the reaction is preferably effected, as stated, in an aqueous medium and at a temperature of about 50 to 95° C. for about 2 to 8 hours. Preferably, for each mol of the 1-amino-2-sulfo-4-brom-anthraquinone reacted, we employ about 2 to 5 mols of the hydroxyalkoxyalkylamine or alkoxyalkylamine in the reaction mixture.

As a suitable amination catalyst, we may employ cupric acetate, cuprous chloride, or activated copper powder. The catalyst is usually employed in an amount of from 0.03 to 0.1 mols for each mol of the susbtituted anthraquinone undergoing reaction. After reaction is completed, the reaction mixture is cooled and the mixture acidified with hydrochloric acid so as to precipitate the amino-anthraquinone intermediate as the hydrochloride. The precipitate is filtered and then washed with dilute hydrochloric acid.

To effect the cyanation reaction, the moist filter press cake or paste remaining is then dissolved in hot water with the addition of sodium bicarbonate, and, after filtration, an alkali metal cyanide, such as sodium or potassium cyanide, is added to the hot filtrate and the reaction mixture obtained then heated to a temperature of about 65 to 100° C. for about 3 to 16 hours. The cyanation reaction taking place introduces a cyano group in each of the 2- and 3-positions.

The alkali metal cyanide is preferably employed in an amount of from about 8.5 to 17 mols for each mol of the anthraquinone intermediate. Increased concentrations of the alkali metal cyanide as well as temperatures above about 100° C. are undesirable as these conditions tend to hydrolyze the amino substituents. After completion of the cyanation reaction, the 1-amino-2,3-dicyano-4-hydroxyalkoxyalkylamino- or alkoxyalkylamino-anthraquinone is filtered off, washed with water and dried.

The novel dyestuffs of our invention may be applied to cellulose acetate or other organic derivative of cellulose textile material by the usual methods for applying dyestuffs thereto. Thus, the novel dyestuffs may be applied in disperse form or with the aid of aqueous solvent dyebaths or by any other convenient method.

In order further to illustrate our invention, but without being limited thereto, the following example is given:

*Example*

A mixture of 19 parts by weight (0.05 mol) of 1-amino - 2 - sulfo - 4 - brom - anthraquinone, 44 parts by weight (0.4 mol) of 70% β-methoxy-ethylamine and 1 part by weight of cupric acetate in 300 parts by weight of water is heated at 80° C. with stirring for about eight hours. The reaction mixture changes in color from red to blue as reaction proceeds with the replacement of the 4-brom group. The reaction mixture is cooled and acidified with hydrochloric acid, the addition of the acid causing the 1-amino-2-sulfo-4-β-methoxy-ethylamino-anthraquinone which forms to precipitate from solution as the hydrochloride. The precipitate is filtered off and washed with 2% aqueous hydrochloric acid. A yield of 15 parts by weight is obtained.

The wet paste of the hydrochloride of 1-amino-2 - sulfo - 4 - β - methoxy - ethylamino - anthraquinone is dissolved in 500 parts by weight of hot water to which is added slowly, with stirring, 4 parts by weight of sodium bicarbonate. The solution is filtered and, after the addition of 10 parts by weight of sodium cyanide to the filtrate, the mixture thus formed is heated at about 80-85° C. for eight hours. The mixture is then heated for an additional three hours with stirring and 1-amino-2,3-dicyano-4-β-methoxy-ethylamino-anthraquinone separates out. The dyestuff is filtered off, washed with water and dried. The initial filtrate is then heated for an additional three hours and a further amount of the desired dyestuff is formed, the same precipitating from solution. The dyestuff which is precipitated on heating the initial filtrate is then dissolved in 60% aqueous acetic acid, and, upon dilution with water to 30% aqueous acetic acid, a second fraction of the 1 - amino - 2,3 - dicyano - 4-β-methoxy-ethylamino-anthraquinone precipitates. The precipitate is filtered off, washed with water and dried. Both the initial dyestuff product and the second precipitated fraction are identical, each having a melting point of 194-196° C. A yield of 55% of theory is obtained. This dyestuff dyes cellulose in a light greenish blue shade fast to light and washing and having a resistance to acid fading of 3 units in accordance with the standard A. A. T. C. C. text.

While the application of the novel dyestuffs of our invention has been more particularly described in connection with cellulose acetate textile materials, textile materials having a basis of other organic derivatives of cellulose may be dyed with our novel dyestuffs as well. Examples of other organic derivatives of cellulose are cellulose esters, such as cellulose propionate, cellulose butyrate, cellulose acetate-propionate, cellulose acetate-butyrate, as well as cellulose ethers such as ethyl cellulose and benzyl cellulose. Textile materials having a basis of a synthetic linear polyamide condensation product or a polyurethane polymer may also be dyed with said dyestuffs.

It is to be understood that the foregoing detailed description is given merely by way of illustration and that many variations may be made therein without departing from the spirit of our invention.

Having described our invention what we desire to secure by Letters Patent is:

1. Anthraquinone dyestuffs of the following general formula:

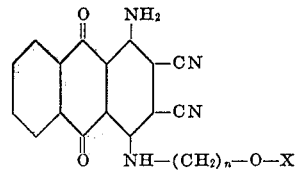

wherein $n$ is an integer of up to about 5 and X is a member of the group consisting of alkyl and hydroxyalkyl groups.

2. The anthraquinone dyestuff

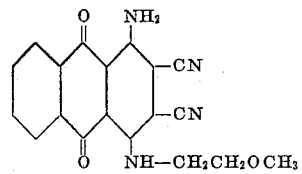

3. The anthraquinone dyestuff

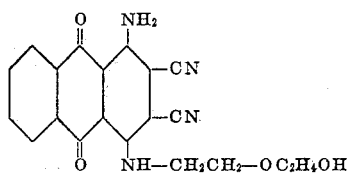

4. The anthraquinone dyestuff

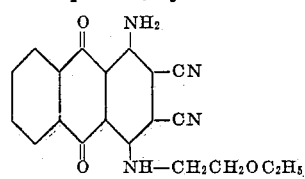

5. Process for the production of anthraquinone dyestuffs of the following general formula:

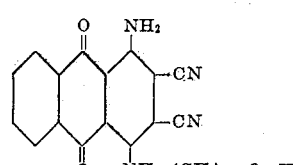

comprising catalytically reacting in an aqueous reaction medium 1 - amino - 2 - sulfo - 4 - brom - anthraquinone with an amine of the formula $NH_2(CH_2)_n-O-X$ wherein $n$ is an integer of up to about 5 and X is a member of the group consisting of alkyl and hydroxyalkyl groups, and then reacting the product obtained with an alkali metal cyanide in an aqueous reaction medium.

6. Process for the production of 1-amino-2,3-dicyano - 4 - β - methoxy - ethylamino - anthraquinone, which comprises catalytically reacting 1-amino-2-sulfo-4-brom-anthraquinone with β-methoxy - ethylamine in an aqueous reaction medium, separating the 1-amino-2-sulfo-4-β-methoxy-ethylamino-anthraquinone formed and reacting the same with an alkali metal cyanide in an aqueous reaction medium.

7. Process for the production of 1-amino-2,3-dicyano - 4 - β - methoxy - ethylamino anthraquinone, which comprises catalytically reacting about one mol ratio of 1-amino-2-sulfo-4-brom-anthraquinone with about 8 mols of β-methoxy-ethylamine in an aqueous reaction medium containing cupric acetate as catalyst employing a temperature of about 50 to 95° C. for about 2 to 8 hours, separating the 1-amino-2-sulfo-4-β-methoxy-ethylamino-anthraquinone formed and reacting the same with an alkali metal cyanide in an aqueous reaction medium.

8. Process for the production of 1-amino-2,3-dicyano - 4 - β - methoxy - ethylamino - anthraquinone, which comprises catalytically reacting about one mol ratio of 1-amino-2-sulfo-4-bromanthraquinone with about 8 mols of β-methoxy-ethylamine in an aqueous reaction medium containing cupric acetate as catalyst employing a temperature of about 50 to 95° C. for about 2 to 8 hours, separating the 1-amino-2-sulfo-4-β-methoxy-ethylamino-anthraquinone formed and reacting the same with about 8.5 to 17 mols of sodium cyanide in an aqueous reaction medium at a temperature of about 65 to 100° C. for about 3 to 16 hours and separating 1 - amino - 2,3 - dicyano - 4 - β - methoxy - ethylamino - anthraquinone.

VICTOR S. SALVIN.
JOHN R. ADAMS, Jr.

REFERENCES CITED

The following references are of record in the file of this patent:

UNITED STATES PATENTS

| Number | Name | Date |
| --- | --- | --- |
| 1,938,029 | Kugel | Dec. 5, 1933 |
| 2,357,176 | Dickey | Aug. 29, 1944 |

FOREIGN PATENTS

| Number | Country | Date |
| --- | --- | --- |
| 512,483 | Great Britain | Sept. 18, 1939 |